Jan. 30, 1962 H. H. THORBROGGER 3,019,388

SIGNAL TIMING CIRCUIT

Filed April 20, 1959

INVENTOR
H. H. THORBROGGER
BY [signature]
ATTORNEY

United States Patent Office 3,019,388

Patented Jan. 30, 1962

3,019,388
SIGNAL TIMING CIRCUIT

Holger H. Thorbrogger, Chicago, Ill., assignor to American Telephone and Telegraph Company, New York, N.Y., a corporation of New York Filed Apr. 20, 1959, Ser. No. 807,661
20 Claims. (Cl. 324—68)

Figure 2:
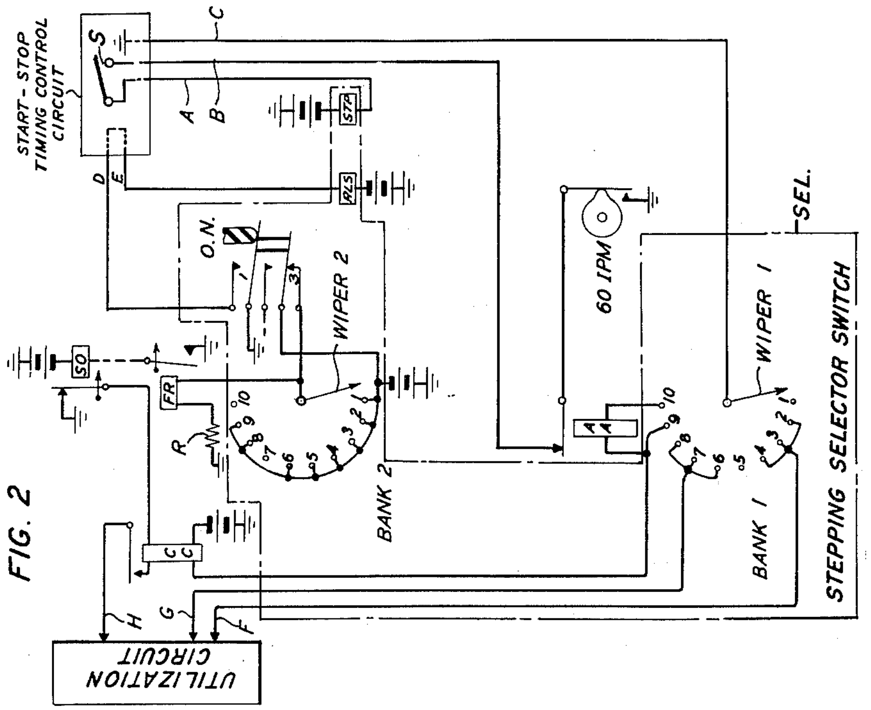

This invention relates generally to timing circuits, is particularly concerned with timing circuits that utilize plural stage counting means, and more particularly relates to timing circuits using electromechanical stepping switches and electromechanical relay time delay arrangements.

A timing circuit is an assembly of equipment and devices used to generate a specific timed interval against which a circuit-acting period or other recurring event may be measured.

In telephone, telegraph and computer systems, innumerable situations occur where it is necessary to employ timing circuits for signaling purposes, trouble detecting, preventing race conditions, and for controlling the sequence of circuit operations. A practical example of this is found in telegraph toll systems. A timing circuit is usually employed in this system for signaling purposes. Its function is to generate timed intervals against which the periods of call, recall and disconnect supervisory line open signals are measured. These signals are used for effecting, supervising and controlling communications connections over toll circuits and are distinguishable from one another only by their time period. In such a system, the occurrence of a trouble line open condition, whose duration exceeds the time period of a disconnect signal, may be falsely interpreted as a disconnect. As a result of this, communications connections are disengaged, the trouble condition is not immediately detected, attendants are not immediately informed of the trouble condition, and that portion of the circuit which caused the trouble remains in trouble until it is detected by routine tests and then corrected.

It is a particular object of this invention to extend the usefulness of such timing circuits by using the timing circuits for producing timed intervals against which the periods of call, recall, disconnect and trouble signal conditions are measured, thereby to automatically prevent the false interpretation of trouble conditions.

In practice, when new requirements dictate a redesign of such timing circuits it may very often be quite difficult to provide for an economical rearrangement of the basic design. In fact, a radical redesign may follow because of the inflexibility built into the initial circuit. This is frequently the case in timing circuits that utilize multistage counting circuits, and particularly in those employing electromechanical stepping switches. The adaptability of this type of counting circuit may be limited by the number of terminal positions available on the switch terminal bank. When new requirements demand terminal positions for additional counting stages and no spare terminal positions are available a problem arises in adapting the circuit to the new requirements and a need appears for a practical means for solving the problem.

A more particular object of the present invention is to overcome the inherent inflexibility and limited adaptability characteristic of such timing circuits that employ stepping switches as counting devices.

Another object of the invention is to provide a pulse generator that generates timing pulses of duration upwards from the millisecond range with controllable interpulse time.

A further object of this invention is to provide a circuit that recognizes each appearance of an information-bearing input pulse and that establishes a unique state for each successive appearance of said input pulse in a given series or train of such pulses.

A feature of the invention is the provision of a timed interrupter for generating pulses at regularly recurring intervals.

Another feature of the invention is the provision of a counting circuit which utilizes a stepping selector switch for counting the number of pulses in a pulse train.

A further feature of the invention relates to the provision of slow-acting relay devices operating in conjunction with a stepping selector switch for determining successive timed intervals.

A still further feature of the invention is the provision of a timing circuit that recognizes a two-to-four second signal condition as a call signal, a six-to-eight second signal condition as a recall signal, a nine-to-ten second signal condition as a disconnect signal and a signal condition exceeding eleven seconds as a trouble signal; and that automatically indicates the occurrence of any of said signals.

Figure 1:
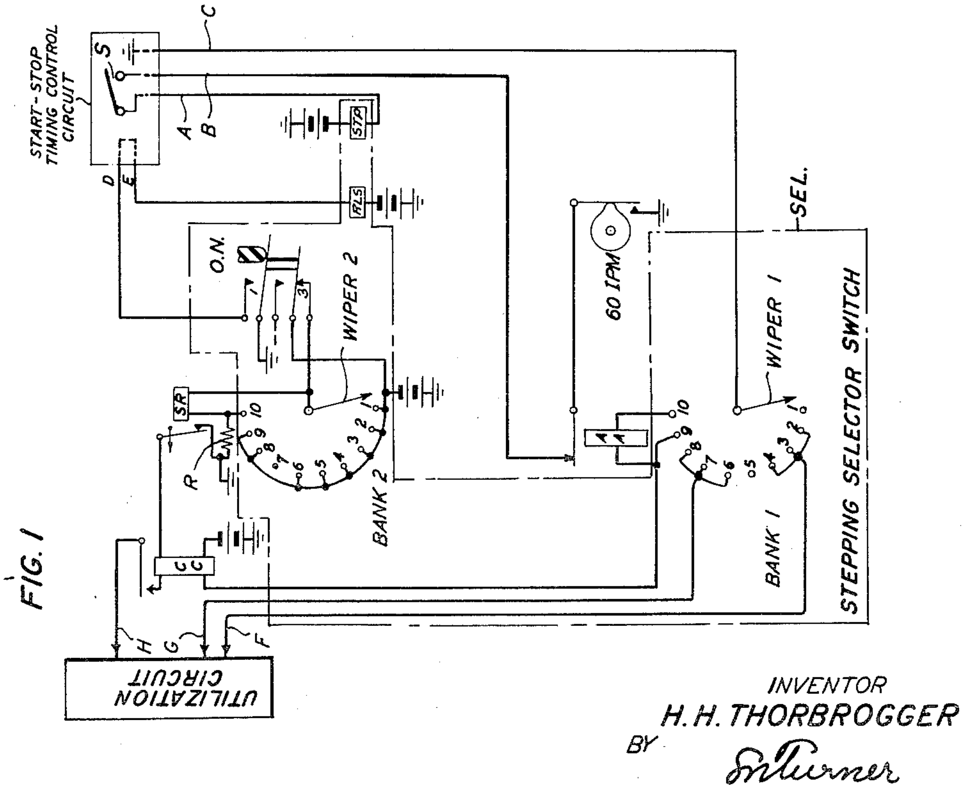

The invention may be more fully understood from the following description when read with reference to the attached drawing in which:

FIG. 1 shows the circuit diagram of a timing circuit embodying features of the invention; and FIG. 2 illustrates a modification of the timing circuit shown in FIG. 1.

For purposes of collating and clearly defining the functional equivalence of the two circuits, they are drawn side by side and utilize, where appropriate, the same designations for circuit elements.

Each of these basic circuit arrangements includes a ten-terminal, two-bank stepping selector switch and its associated control circuitry; a pulse generator for supplying timed interrupted ground pulses; a circuit for connecting; and time delay means.

A start-stop timing control circuit is shown in block diagram form in both FIGS. 1 and 2. This circuit simulates the operations usually performed by a signal receiving circuit such as is generally found in communication supervisory circuits. It functions primarily to connect conductor A to conductor B to start the timing cycle; upon commencing timing to disconnect conductor D from conductor E and to supply a ground signal over conductor C (simulating the operations performed when a signal is received); disconnect conductor A from conductor B to stop timing; after timing is stopped to disconnect, after a predetermined time interval, the ground supplied to conductor C; and then to connect conductor D to conductor E for recycling the timing circuit (simulating the operations performed upon the cessation of a received signal).

The stepping selector switch suitable for use in the exemplary embodiment of this invention may be similar to that disclosed in the United States Patent 2,701,283 granted to L. W. Droel on February 1, 1955. Reference may be made to this patent for a more detailed description of the switch structure and of the functions of the various structural switch elements during the switch operation. In FIGS. 1 and 2, the control circuitry for the SEL switch includes a stepping magnet STP and a release magnet RLS. The STP magnet is provided for supplying the power for stepping wipers 1 and 2 of the switch from terminal to terminal when the circuit through its winding is closed to the source of interrupted ground. This circuit closure causes magnet STP to energize and deenergize under control of interrupted ground. For each separate energization and deenergization cycle of magnet STP, the wipers advance one terminal. The RLS magnet is operable at any desired time during the switch operation for restoring the switch to the normal condition (as shown).

In FIGS. 1 and 2, the pulse generator, designated 60 IPM, supplies the time interrupted ground impulses. This generator may be of various types; appropriate equipment may be a mechanically or electrically driven interrupter. The pulse generating rate is designed to be approximately sixty pulses per minute (approximately one pulse per second). The pulse width is designed to be several milliseconds.

In FIGS. 1 and 2, the means for connecting signaling means comprises relay CC. This relay is used as the means through which ground is connected from the time delay means to the utilization circuit during certain stages of the timing operation.

The circuits of FIGS. 1 and 2 use different means for obtaining a time delay. In FIG. 1, a slow release relay SR is used as the means, whereas in FIG. 2, the combination of a fast release relay FR and a slow operate relay SO is used.

A utilization circuit is shown in block diagram form in both of the FIGS. 1 and 2 to illustrate the manner in which the potential indicating the call, recall, disconnect and trouble signals may be utilized. This circuit may be adapted, by techniques well-known in the art, to supply distinct audible or visual indications of the measured signals in response to the connection of ground potential to the conductors F, G and H.

The circuits of FIGS. 1 and 2 are arranged to time in four stages. The periods of timing start in a first timing stage and progress into a second, third and fourth timing stage as required; in this manner the periods are progressively longer in duration. The period of timing in the first stage is a maximum of approximately four seconds duration and is used for timing the period of a call signal condition. The second timing stage is a continuation of timing after timing in the first timing stage. It continues timing to a maximum of approximately eight seconds and is used for timing the period of a recall signal condition. Similarly, the third timing stage is a continuation of timing after timing in the second timing stage. It continues timing to a maximum of approximately ten seconds and is used for timing the period of a disconnect signal condition. The fourth timing stage continues timing after timing in the third timing stage to a maximum of approximately eleven seconds and is used for timing the period of a trouble signal condition of duration longer than a maximum of approximately eleven seconds.

The detailed description of the circuits shown in FIGS. 1 and 2 for different signal conditions is similar with respect to the switch and its control circuit operation and differs with respect to the time delay means. Therefore, in order to emphasize these similarities and differences of the functionally equivalent circuits, the operations of the two circuits are described concurrently.

The detailed description of the circuit operation is simplified by assuming initially that the circuits are in the normal or idle condition. The idle condition of the circuit shown in FIG. 1 is as follows: The STP magnet, magnet RLS, relay AA and relay CC are deenergized; and the slow release relay SR is operated. The idle condition of the circuit shown in FIG. 2 is as follows: The STP magnet, magnet RLS, relay AA, relay CC and the slow operate relay SO are deenergized; and the fast release relay FR is operated.

The slow release relay SR of FIG. 1 and the fast release relay FR of FIG. 2, in the normal or idle condition, are operated under control of circuits through their respective windings. Each circuit through the windings of relays SR and FR extends from ground through resistance R, the relay winding, and O.N. (switch offnormal) contact 3 to negative battery (positive terminal grounded).

Negative battery is connected to terminals 1, 2, 3, 4, 5, 6, 8 and 9 of SEL switch bank 2 in each circuit and during stepping of switch SEL this battery potential is used for controlling the operation of relays SR and FR. Relays SR and FR are operated during stepping whenever wiper 2 is in contact with terminals to which negative battery is connected.

The circuits of FIGS. 1 and 2 operate in the following manner: When a signal condition occurs, the start-stop control circuit closes the signal switch S to complete the circuit over conductors A and B via a break contact of relay AA for energizing and deenergizing magnet STP under control of ground interrupted approximately sixty times per minute. The magnet STP cooperates in a manner well known in the telephony and telegraphy arts with a pawl and ratchel mechanism (not shown) of the switch SEL to motivate the wipers 1 and 2. Upon the energization of magnet STP, a pawl (not shown), which is coupled to the armature (not shown) of the magnet STP, is forced against the teeth (not shown) of the ratchet wheel (not shown) on a shaft (not shown) supporting the wipers 1 and 2 to cause the shaft to rotate and thereby move the wipers from one terminal position to the next. When the magnet STP is deenergized, a detent (not shown) of the switch SEL engages the ratchet wheel to hold the wipers in the advanced terminal position. Each separate energization and deenergization cycle of magnet STP causes wipers 1 and 2 to step at a rate of approximately one step per second. The O.N. contacts of the switch SEL are affixed to a mounting plate (not shown) of the switch SEL and are actuated by a cam (not shown), which is affixed to the shaft (not shown) supporting the wipers 1 and 2, when this shaft is rotated to move the wipers from their normal position as shown in the drawings. These contacts thereafter remain actuated under control of the cam (not shown) until the shaft (not shown) is rotated to return the wipers, as hereinafter described, to their normal position. It is noted that reference may be made to the aforementioned Droel patent for a more detailed explanation of the manner in which the switch SEL may be motivated. Ground potential is connected to wiper 1 over conductor C under control of apparatus (not shown) in the start-stop circuit at the start of the signal condition in order to pass a signal to the various terminals of bank 1 during stepping.

For a call signal condition, magnet STP is energized and deenergized two, three or four separate times to cause wipers 1 and 2 to advance to the second, third or fourth terminals of banks 1 and 2. When wiper 1 is in contact with terminal 2, 3, or 4, the ground connected to wiper 1 is connected through this terminal over conductor F to the utilization circuit to cause other circuit operations in order to give, at the end of the call signal condition, an indication of the measured period.

The STP magnet is energized and deenergized six, seven or eight separate times for a recall signal condition to cause wipers 1 and 2 to advance to the sixth, seventh, or eighth terminals of banks 1 and 2. As wiper 1 passes over terminal 6, 7 or 8, ground is connected through this terminal to conductor G and to the utilization circuit wherein it may then be used to start a sequence of circuit operations for indicating, at the end of the recall open condition, the duration of the measured period.

For a disconnect signal condition, magnet STP is energized and deenergized nine or ten times and causes wipers 1 and 2 to advance to the ninth or tenth terminals of banks 1 and 2. When wiper 1 is in contact with terminal 9 of bank 1, a circuit is completed for operating relay CC. The operating path for relay CC extends from ground, through wiper 1, terminal 9 of bank 1, the lower winding of relay CC to negative battery. Relay CC operates and remains operated if the wipers advance another step because the circuit path through terminal 10 of bank 1 and the winding of relay AA maintains the operating circuit for that relay closed. The operation of relay CC actuates its contact for connecting ground from a contact of the time delay means to conductor H. In FIG. 1, this ground is connected at the front contact of relay SR. In FIG. 2, this ground is connected at the back contact of relay SO. The ground connected to conductor H may be used to cause operations in the utilization circuit which supply an indication of the measured period.

For a trouble signal condition of longer duration than approximately eleven seconds, magnet STP is energized and deenergized ten separate times to cause wipers 1 and 2 to step to the tenth terminals of banks 1 and 2. Relay CC is operated when wiper 1 steps to terminal 9 of bank 1 and remains operated as wiper 1 steps to terminal 10 as hereinbefore described. The make contact of relay CC connects ground from a contact of the time delay means over conductor H to the utilization circuit. When the wipers advance to the tenth terminals, relay AA is connected into the circuit through the lower winding of relay CC, thus holding relay CC operated in series with relay AA. Relay AA operates and actuates its break contact to open the circuit through the winding of magnet STP. The opening of this circuit cancels further energization of magnet STP and thereby stops further stepping of switch SEL. When wiper 2 advances to terminal 10 of bank 2, the time delay means is operable for beginning timing in the fourth timing stage. The time delay means employed in FIG. 1 operates in the following manner: As wiper 2 steps to terminal 10 of bank 2 the connection between negative battery and the winding of relay SR is opened and the winding of relay SR is shunted by a low impedance circuit. This shunt circuit extends from the junction of terminal 10 of bank 2 and resistance R and one terminal of the winding of relay SR to the other terminal of the winding of relay SR through wiper 2. The shunting of the energizing winding in addition to the slow release characteristic of relay SR causes it to release approximately one second after wiper 2 steps to terminal 10 of bank 2. After the timed delay, the contact of relay SR opens and disconnects ground from conductor H. The removal of ground from the conductor H at this stage of the circuit operation may be used in the utilization circuit to supply an indication of a trouble signal condition. Similarly, in FIG. 2, when wiper 2 advances to terminal 10 of bank 2, the connection between negative battery and the winding of relay FR is opened and relay FR releases. The break contact of relay FR then closes the circuit through the winding of relay SO and, after a timed delay, causes relay SO to operate. Relay SO operates approximately one second after wiper 2 advances to terminal 10 of bank 2. The break contact of relay SO is then actuated to disconnect ground from conductor H. The removal of ground from conductor H at this stage of the circuit operation may be used in the utilization circuit to supply an indication of a trouble signal condition.

Upon cessation of a signal condition in any stage of timing, apparatus (not shown) in the start-stop control circuit is effective to open the connection between conductors A and B to stop further energization of magnet STP, remove the ground connected to wiper 1 after a delay required to read-out the information corresponding to the measured interval, and connect conductor D to conductor E for causing the energization of magnet RLS. The RLS magnet is energized over the path extending from ground through O.N. contact 1, conductors D and E, and the winding of magnet RLS to negative battery in order to restore switch SEL to the idle condition. As is similarly described in the aforementioned Droel patent, when the magnet RLS is energized, an armature (not shown) coupled to that magnet, withdraws the aforementioned switch detent (not shown) from the teeth (not shown) of the ratchet wheel (not shown) of the switch SEL to effect the release of the switch under the influence of the switch restoring spring (not shown). When the switch releases, the wipers 1 and 2 are returned to their normal position as shown in the drawings. Magnet RLS remains energized until O.N. contact 1 is opened by the switch cam (not shown) during the restoration of switch SEL to the idle condition. When the switch SEL is restored to the idle condition, O.N. contact 1 is opened and magnet RLS is deenergized; and if operated, relay CC is released and the time delay means are returned to the condition as shown in FIGS. 1 and 2.

This completes the cycle of operation by returning the circuits to the conditions assumed initially.

The specific embodiments described herein are illustrative of the principles of the invention. In light of this teaching, it is apparent that numerous other arrangements may be devised by those skilled in the art without departing from the spirit and scope of the invention.

What is claimed is:

1. A circuit for determining the time duration of a signal condition comprising a pulse generator for generating a series of pulses, a plural stage counting circuit having a start condition and operative under control of pulses from said pulse generator upon the occurrence of a signal condition to advance from said start condition into and through a first stage and successive intermediate stages toward a last stage as long as said signal condition persists, means for rendering said counting circuit inoperative to stop the advance in any stage upon the cessation of a signal condition, first circuit means for causing said counting circuit to assume said start condition subsequent to the cessation of a signal condition, each of said stages except said last stage representing a discrete time duration in advance of said counting circuit, second circuit means associated with said last stage and operative under the control of the advance of said counting circuit into said last stage for measuring a prescribed time duration subsequent to the advance into said last stage, third circuit means controlled by the advance of said counting circuit into any stage except said last stage for indicating the time duration represented by said stage, and fourth circuit means associated with said third circuit means and controlled by said second circuit means for indicating said prescribed measured duration subsequent to the advance into said last stage.

2. A circuit for determining the time duration of a signal condition comprising a pulse generator for generating a series of pulses, a plural stage counting circuit having a start condition and operative under control of pulses from said pulse generator upon the occurrence of a signal condition to advance from said start condition into and through a first stage and successive intermediate stages toward a last stage as long as said signal condition persists, means for rendering said counting circuit inoperative thereby to stop the advance in any stage upon the cessation of a signal condition, first circuit means for causing said counting means to assume said start condition subsequent to the cessation of a signal condition, each of said stages except said last stage representing a discrete time duration in the advance of said counting circuit, time delay means associated with said last stage and controlled by the advance of said counting circuit into said last stage and operative after a prescribed time delay for measuring a prescribed time duration subsequent to the advance into said last stage, second circuit means associated with said last stage of said counting circuit and controlled by the advance into said last stage for rendering said counting circuit inoperative thereby to stop the advance at said last stage, third circuit means controlled by the advance of said counting circuit into any stage except said last stage for indicating time duration represented by said stage, and fourth circuit means associated with said third circuit means and controlled by said time delay means for indicating said prescribed measured time duration subsequent to the advance into said last stage.

3. A circuit for determining the time duration of a signal condition comprising a pulse generator for generating timing pulses against which the time duration of a signal condition is measured, a four-stage counting circuit having a start condition and operative under control of timing pulses from said pulse generator upon the occurrence of a signal condition for advancing from said start condition into and through a first stage thence into and through a second stage thence into and through a third stage and thence into a last stage as long as said signal condition persists, means for rendering said counting circuit inoperative thereby to stop the advance in any stage upon the cessation of a signal condition, first circuit means for causing said counting circuit to assume said start condition subsequent to the cessation of a signal condition, each of said stages except said last stage representing a discrete time duration in the advance of said counting circuit, second circuit means associated with said last stage and operative under the control of the advance of said counting circuit into said last stage for measuring a prescribed time duration subsequent to the advance into said last stage, third circuit means controlled by the advance of said counting circuit into any stage except said last stage indicating the time duration represented by said stage, and fourth circuit means associated with said third circuit means and controlled by said second circuit means for indicating said prescribed measured time duration subsequent to the advance into said last stage.

4. A circuit for determining the time duration of a signal condition comprising a pulse generator for generating timing pulses against which the time duration of a signal condition is measured, a four-stage counting circuit having a start condition and operative under control of timing pulses from said pulse generator upon the occurrence of a signal condition to advance from said start condition into and through a first stage thence into and through a second stage thence into and through a third stage and into a last stage as long as said signal condition persists, means for rendering said counting circuit inoperative thereby to stop the advance in any stage upon the cessation of a signal condition, first circuit means for causing said counting circuit to assume said start condition subsequent to the cessation of a signal condition, each of said stages except said last stage representing a discrete time duration in the advance of said counting circuit, time delay means associated with said last stage and controled by the advance of said counting circuit into said last stage and operative after a prescribed time delay for measuring a prescribed time duration subsequent to the advance into said last stage, second circuit means associated with said last stage of said counting circuit and controlled by the advance into said last stage for rendering said counting circuit inoperative thereby to stop the advance at said last stage, third circuit means controlled by the advance of said counting circuit into any stage except said last stage for indicating the time duration represented by said stage, and fourth circuit means associated with said third circuit means and controlled by said time delay means for indicating said prescribed measured interval subsequent to the advance into said last stage.

5. A timing circuit for generating time intervals against which the time duration of a signal condition is measured comprising a pulse generator for generating timing pulses, a four-stage counting circuit having a start condition and operative under control of said timing pulses upon the occurrence of a signal condition to advance from said start condition into and through a first stage thence into and through a second stage thence into and through a third stage thence into a last stage as long as said signal condition persists, means for rendering said counting circuit inoperative thereby to stop the advance in any stage upon the cessation of a signal condition, first circuit means for causing said counting circuit to assume said start condition subsequent to the cessation of a signal condition, each of said stages except said last stage representing a discrete time duration in the advance of said counting circuit, second circuit means associated with said last stage and operative under the control of the advance of said counting circuit into said last stage for measuring a prescribed time duration subsequent to the advance into said last stage, a first signal source for supplying a first signal, means associated with said first stage of said counting circuit for conveying said first signal from said first signal source to indicate a first measured time duration during counting in said first stage, means associated with said second stage of said counting circuit for conveying said first signal from said first signal source to indicate a second measured time duration during counting in said second stage, a second signal source for supplying a second signal, third circuit means associated with said third stage of said counting circuit responsive to said signal from said first signal source for conveying said second signal from said second signal source to indicate a third measured time duration during counting in said third stage, and means included in said third circuit means and controlled by said second circuit means for indicating a fourth measured time duration at the end of timing in said last stage.

6. The invention defined in claim 5 wherein said plural stage counting circuit comprises stepping means.

7. The invention defined in claim 6 wherein said stepping means comprises a stepping selector mechanism.

8. The invention defined in claim 7 wherein said stepping selector mechanism comprises a multibank stepping selector switch.

9. The invention defined in claim 8 wherein said multibank stepping selector switch comprises a two-bank stepping selector switch and a single stepping magnet for controlling said switch.

10. The invention defined in claim 5 wherein said second circuit means comprises time delay means.

11. The invention defined in claim 10 wherein said time delay means comprises a time delay circuit.

12. The invention defined in claim 11 wherein said time delay circuit comprises an electromechanical relay time delay arrangement.

13. The invention defined in claim 12 wherein said electromechanical relay time delay arrangement comprises a slow release relay.

14. The invention defined in claim 12 wherein said electromechanical relay time delay arrangement comprises a fast release relay and a slow operate relay in combination.

15. A circuit for determining the time duration of a signal condition comprising a stepping selector switch having a first terminal bank comprising a first, second and third group of terminals, a second terminal bank comprising a first terminal, intermediate terminals and a last terminal, a first wiper for cooperating with said first bank of terminals, a second wiper for cooperating with said second bank of terminals, a stepping magnet operable for causing the stepping of said first and second wipers from terminal to terminal, a release magnet operable for causing the release of said switch, and switch contact means controlled by the action of said switch; a potential source connected to said switch contact means and to said first and all intermediate terminals except one of said second bank of terminals for supplying control potential to said second wiper in all step positions thereof except those corresponding to the said one intermediate terminal and to said last terminal of said second bank; a pulse source for generating a train of timing pulses; a signaling channel associated with said stepping magnet and said pulse source, said stepping magnet connected over said signaling channel with said pulse source when a signal condition occurs on said signaling channel and thereafter controlled by said timing pulses from said pulse source for progressively stepping said first and second wipers from terminal to terminal and disconnected from said pulse source and rendered inoperable upon the cessation of a signal condition on said signaling channel; a first signal source for supplying a signal to said first wiper; a first conductor associated with said first terminal group of said first bank for conveying said signal from said first signal source to indicate a first measured interval when said first wiper is associated with said first terminal group; a second conductor associated with said second terminal group of said first bank for conveying said signal from said first signal source to indicate a second measured interval when said first wiper is associated with said second terminal group; a third conductor; a second signal source for supplying a signal; first circuit means associated with said third terminal group of said first bank and responsive to said signal from said first signal source for connecting said signal from said second signal source to indicate a third measured interval when said first wiper is associated with said third terminal group; second circuit means associated with the last terminal of said third terminal group of said first bank and responsive to said signal from said first signal source for discontinuing stepping when said first wiper steps to said last terminal of said third terminal group; and third circuit means associated with said second wiper and responsive to control potential connected to said second wiper to denote that said switch is in any step position thereof other than those corresponding to said one intermediate terminal and to said last terminal of said second bank, said third circuit means controlled by the disconnection of said control potential from said second wiper when said second wiper steps to said last terminal of said second bank for automatically after a predetermined timed interval disconnecting the signal connected to said third conductor from said second signal source to indicate a fourth measured interval.

16. The invention defined in claim 15 wherein said third circuit means comprises timed delay means.

17. The invention defined in claim 16 wherein said timed delay means comprises a timed delay circuit.

18. The invention defined in claim 17 wherein said timed delay circuit comprises an electromechanical relay timed delay arrangement.

19. The invention defined in claim 18 wherein said electromechanical relay timed delay arrangement comprises a slow release relay, said relay having a two-terminal winding and contact means, said winding having one terminal connected to said second wiper of said switch and a second terminal connected in parallel to said last terminal of said second bank and to resistance ground potential whereby said relay is operable whenever said control potential is connected to said second wiper, said relay controlled by the disconnection of said control potential from said second wiper and by a control connection between said second terminal of said winding and said last terminal of said second bank for shunting said winding by a low impedance when said second wiper steps to said last terminal of said second bank, said relay contact means operable in response to the timed release of said relay for automatically after a predetermined timed interval disconnecting the signal connected to said third conductor from said second signal source to indicate a fourth measured interval.

20. The invention defined in claim 18 wherein said electromechanical relay timed delay arrangement comprises a fast release relay having a two-terminal winding and first relay contact means controlled by the action of said fast release relay, a slow operate relay having a two-terminal winding and second relay contact means controlled by the action of said slow operate relay, said fast release relay having one terminal of said winding connected to said second wiper and a second terminal of said winding connected to resistance ground potential whereby said fast release relay is operable whenever said control potential is connected to said second wiper, said fast release relay released by the disconnection of said control potential from said second wiper when said second wiper steps to said last terminal of said second bank, said first relay contact means operable in response to the release of said fast release relay for causing the energization of said winding of said slow operate relay, said second relay contact means operable in response to the timed operation of said slow operate relay for automatically after a predetermined time disconnecting the signal connected to said third conductor from said second signal source to indicate a fourth measured interval.

References Cited in the file of this patent

UNITED STATES PATENTS

| | | |
|---|---|---|
| 2,461,266 | Gay | Feb. 8, 1949 |
| 2,489,282 | From | Nov. 29, 1949 |
| 2,500,287 | Kent | Mar. 14, 1950 |